United States Patent
Mühlberger et al.

(10) Patent No.: US 8,480,051 B2
(45) Date of Patent: Jul. 9, 2013

(54) VEHICLE SEAT, ESPECIALLY MOTOR VEHICLE SEAT

(75) Inventors: Joachim Mühlberger, Obersülzen (DE); Birger Hahn, Kircheimbolanden (DE)

(73) Assignee: Keiper GmbH Co. KG, Kaiserslautern (DE)

( * ) Notice: Subject to any disclaimer, the term of this patent is extended or adjusted under 35 U.S.C. 154(b) by 476 days.

(21) Appl. No.: 12/722,732

(22) Filed: Mar. 12, 2010

(65) Prior Publication Data

US 2010/0237218 A1 Sep. 23, 2010

(30) Foreign Application Priority Data

Mar. 19, 2009 (DE) ............... 10 2009 014 375
Feb. 9, 2010 (DE) ............... 10 2010 007 804
Feb. 9, 2010 (DE) ............... 20 2010 002 237 U

(51) Int. Cl.
| F16M 13/00 | (2006.01) |
| A45D 19/04 | (2006.01) |
| A47J 47/16 | (2006.01) |
| E04G 3/00 | (2006.01) |
| A47F 5/00 | (2006.01) |
| A47F 1/10 | (2006.01) |
| B60N 2/02 | (2006.01) |
| B60N 2/48 | (2006.01) |

(52) U.S. Cl.
USPC ........ 248/424; 248/425; 248/429; 248/155.3; 248/287.1; 248/298.1; 248/286.1; 297/378.1; 297/378.14; 297/334; 297/335; 297/336; 296/65.09; 296/65.01; 296/65.05; 296/65.03; 296/65.14; 280/226.1; 312/350

(58) Field of Classification Search
USPC ............. 248/65.05, 65.09, 424, 425, 429, 248/27.1, 155.3, 432, 287.1, 298.1, 240, 248/286.1; 297/378.1, 378.14, 334–336; 296/65.09, 65.01, 65.03, 65.14; 280/226.1; 312/350
See application file for complete search history.

(56) References Cited

U.S. PATENT DOCUMENTS

| 2,102,979 | A | * | 12/1937 | Smith | 297/216.19 |
| 4,157,797 | A | * | 6/1979 | Fox | 244/122 R |
| 4,637,653 | A | * | 1/1987 | Yoshida et al. | 297/334 |
| 4,880,268 | A | * | 11/1989 | Brambilla | 296/65.05 |
| 4,969,682 | A | * | 11/1990 | Gray | 297/378.1 |
| 5,988,726 | A | * | 11/1999 | Onoda et al. | 296/65.05 |
| 6,059,345 | A | * | 5/2000 | Yokota | 296/65.14 |
| 6,079,763 | A | * | 6/2000 | Clemente | 296/65.05 |
| 6,655,738 | B2 | * | 12/2003 | Kammerer | 297/331 |

(Continued)

FOREIGN PATENT DOCUMENTS

DE 198 24 931 12/1998

*Primary Examiner* — Terrell McKinnon
*Assistant Examiner* — Christopher Garft
(74) *Attorney, Agent, or Firm* — McGlew and Tuttle, P.C.

(57) ABSTRACT

A vehicle seat (1) is provided with a base (3), which is connected to a vehicle structure (7). The vehicle seat (1) is adjustable at least between a use position and an easy-entry position. The vehicle seat (1) is guided displaceably in at least one track (5) with at least one first, straight area (15a) and at least one additional, curved area (15c). At least three rollers (17, 23, 23") or link blocks are provided each per track (5). The three rollers (17, 23, 23") support the vehicle seat (1) in the use position in the same at the track (5) and only two of the rollers (17, 23) or link blocks are arranged within the same track (5) in the easy-entry position.

21 Claims, 6 Drawing Sheets

U.S. PATENT DOCUMENTS

| | | | |
|---|---|---|---|
| 6,964,452 B2 * | 11/2005 | Kammerer | 297/331 |
| 2003/0080577 A1 * | 5/2003 | Roberts et al. | 296/65.09 |
| 2006/0016840 A1 * | 1/2006 | Svenson et al. | 224/42.32 |
| 2006/0103174 A1 * | 5/2006 | Queveau et al. | 297/15 |

* cited by examiner

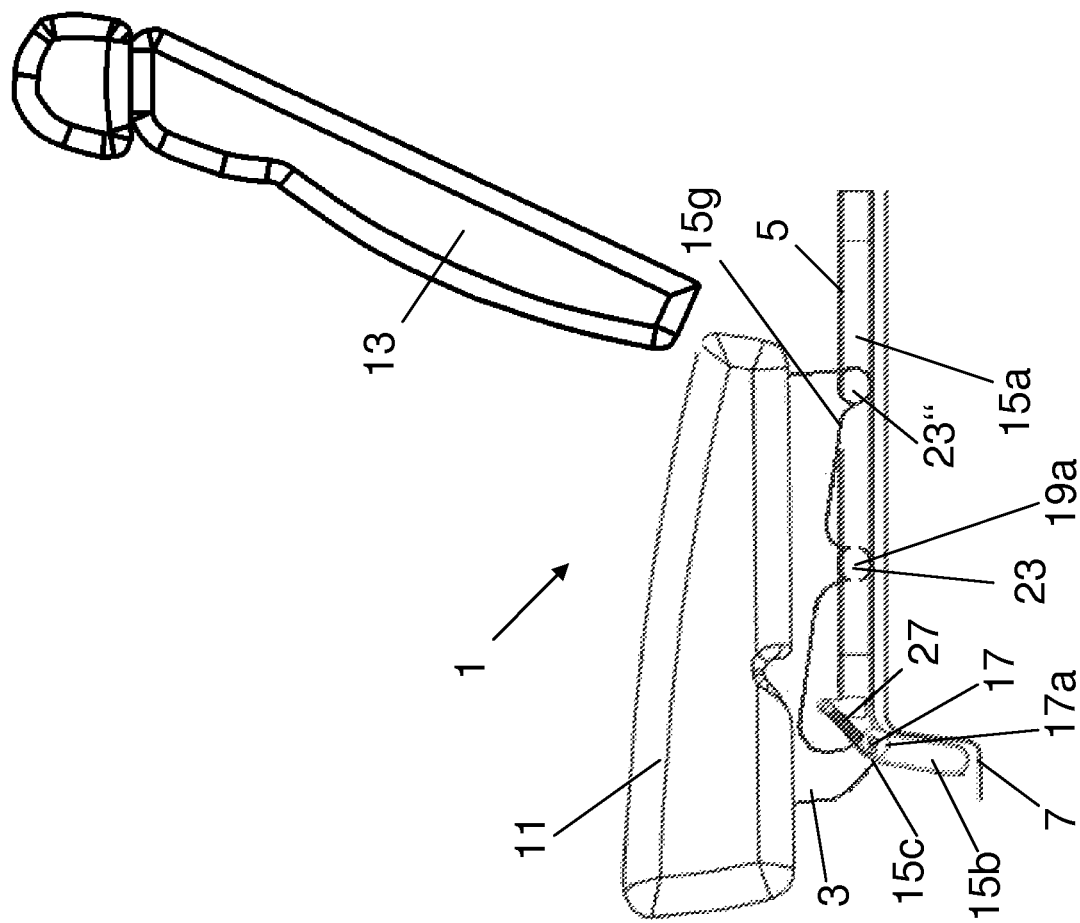

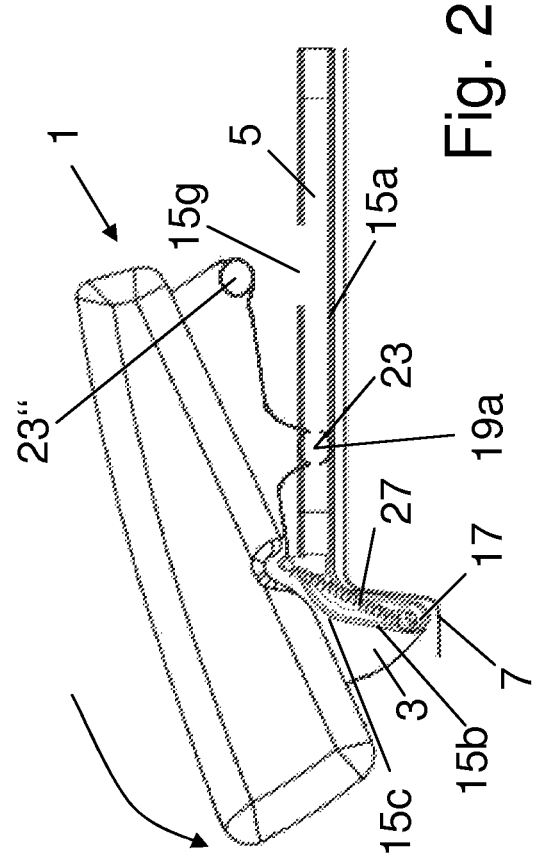

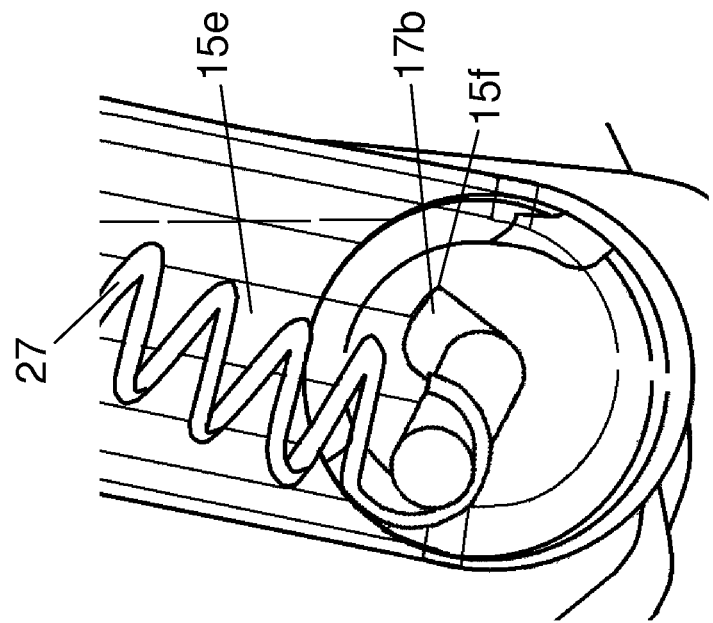
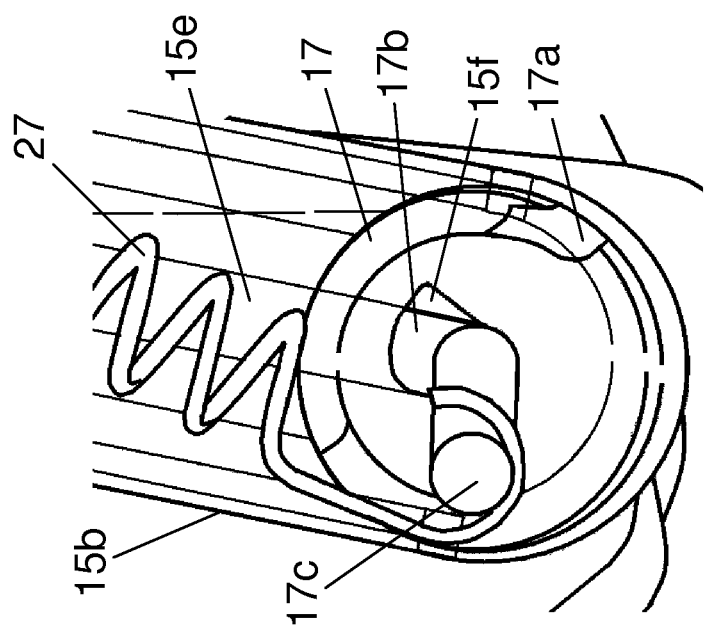

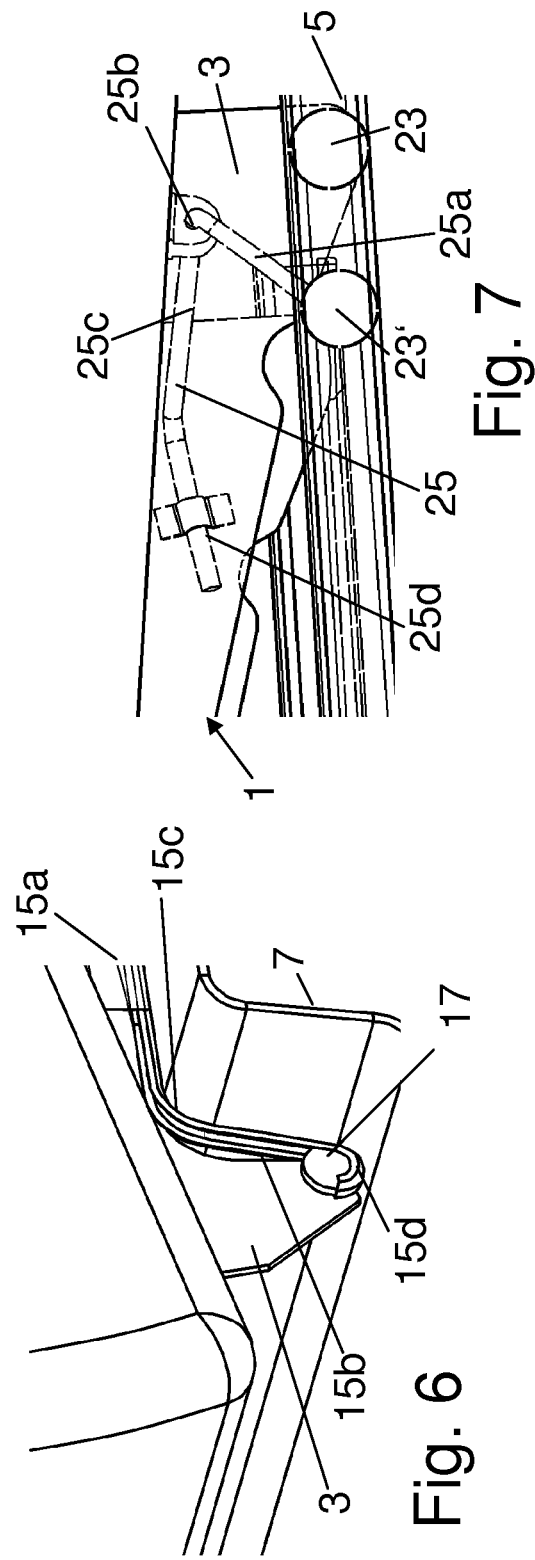

VEHICLE SEAT, ESPECIALLY MOTOR VEHICLE SEAT

CROSS REFERENCE TO RELATED APPLICATIONS

This application claims the benefit of priority under 35 U.S.C. §119 of German Patent Application DE 10 2009 014 375.0 filed Mar. 19, 2009, German Patent Application DE 20 2010 002 237.1 filed Feb. 9, 2010 and German Patent Application DE 10 2010 007 804.2 filed Feb. 9, 2010, the entire contents of each of which are incorporated herein by reference.

FIELD OF THE INVENTION

The present invention pertains to a vehicle seat, and more particularly to a vehicle seat with a base, which is connected to a vehicle structure, wherein the vehicle seat is adjustable at least between a use position and an easy-entry position.

BACKGROUND OF THE INVENTION

A vehicle seat is known from DE 198 24 931 B4 with a base, which is to be connected to the vehicle structure, wherein the vehicle seat can be adjusted at least between a use position and an easy-entry position, and the vehicle seat is guided displaceably in a track with at least one first, straight area and at least one additional area arranged at an angle hereto. Two supports arranged rigidly at the vehicle seat are guided in the track in this case.

U.S. Pat. No. 2,102,979 A discloses a vehicle seat, whose tilt can be adjusted while the user is sitting down and which provides a track guide with two rollers per track and a spring-type resetting means by means of a wound tension spring.

SUMMARY OF THE INVENTION

The basic object of the present invention is to improve a vehicle seat of the type mentioned in the introduction, especially in respect to the easy-entry position.

The vehicle seat according to the present invention can be adjusted at least between a use position and an easy-entry position, wherein it is guided displaceably in at least one track, which shall also include connecting links, with at least one first, straight area and at least one additional, curved area (i.e., an area with finite curvature). Contrary to longitudinally adjustable vehicle seats, which are displaceable in the straight direction only, a complicated lever and hinge arrangement for assuming the easy-entry position can be done away with due to the curved area. The entire arrangement can be made markedly more simple; in particular, the number of parts, the number of bearing points and weight can be reduced. Mutually corresponding tracks are usually provided on the two sides of the seat for guiding the seat. Due to the provision of three connection points between the vehicle seat and the track, the maximally occurring force can be better distributed during normal use, but only two of the three connection sites engage the track for assuming the easy-entry position, as a result of which optimization can be achieved in terms of the pivot angle.

The track is preferably formed by a track that is, for example, C-shaped in cross section. At least one roller or link block, which roller or link block is guided in the track along the longitudinal extension thereof, is preferably arranged in the track. A partial area of the track is provided with an opening, wherein at least one roller or link block is arranged exclusively in a non-use position outside the track, and this roller or link block moves through this opening to outside the track during the transition from the use position into the non-use position.

The track especially preferably has a second, straight area, which is separated from the first, straight area by a curved area. The curvature of the track in the curved area preferably assumes an angle of up to 90°, especially less than 90° and especially preferably up to 80°. The angle of less than 90°, especially up to 80°, ensures that the seat can be moved out of the easy-entry-position without applying an excessive force.

The vehicle seat preferably has a pivot axis, which extends at right angles to the track of the vehicle seat. The pivot axis moves along a straight line in the longitudinal direction of the track when leaving the use position and passing over into the easy-entry position.

At least one spring, which counteracts the force of gravity of the vehicle seat in the easy-entry position, is especially preferably provided. It is, of course, also possible to provide any other means as desired to facilitate the return of the vehicle seat.

At least one stop, which comes into contact with the vehicle structure or with an opposing surface of the track when the easy-entry position is reached and blocks the further displacement of the vehicle seat in that direction, is preferably provided at the vehicle seat. The stop is preferably made separately from the rollers or link blocks, so that overloading of the track can be prevented with certainty.

The vehicle seat can be especially preferably locked in the easy-entry-position by a locking structure. This locking structure may be provided separately or integrated with the locking in the use position (or in one of the use positions).

The present invention will be explained in more detail below on the basis of an exemplary embodiment shown in the drawings with variants. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view of the exemplary embodiment of a vehicle seat in a transition position it occupies as it moves into the easy-entry position;

FIG. 2 is the arrangement according to FIG. 1 in the locked easy-entry position;

FIG. 3 is a detail view showing a detail of FIG. 2 in an unlocked position of the front roller;

FIG. 4 is a detail view showing a detail of FIG. 2 in a locked position of the front roller;

FIG. 6 is an enlarged perspective view of a first variant of the exemplary embodiment in the lower area of the vehicle seat and of the vehicle structure;

FIG. 7 is a slightly perspective detail view of the second variant of the exemplary embodiment of a vehicle seat in the use position;

FIG. 8 is a slightly lateral view of the vehicle seat from FIG. 4 in the easy-entry position.

DESCRIPTION OF THE PREFERRED EMBODIMENTS

Figure 5:
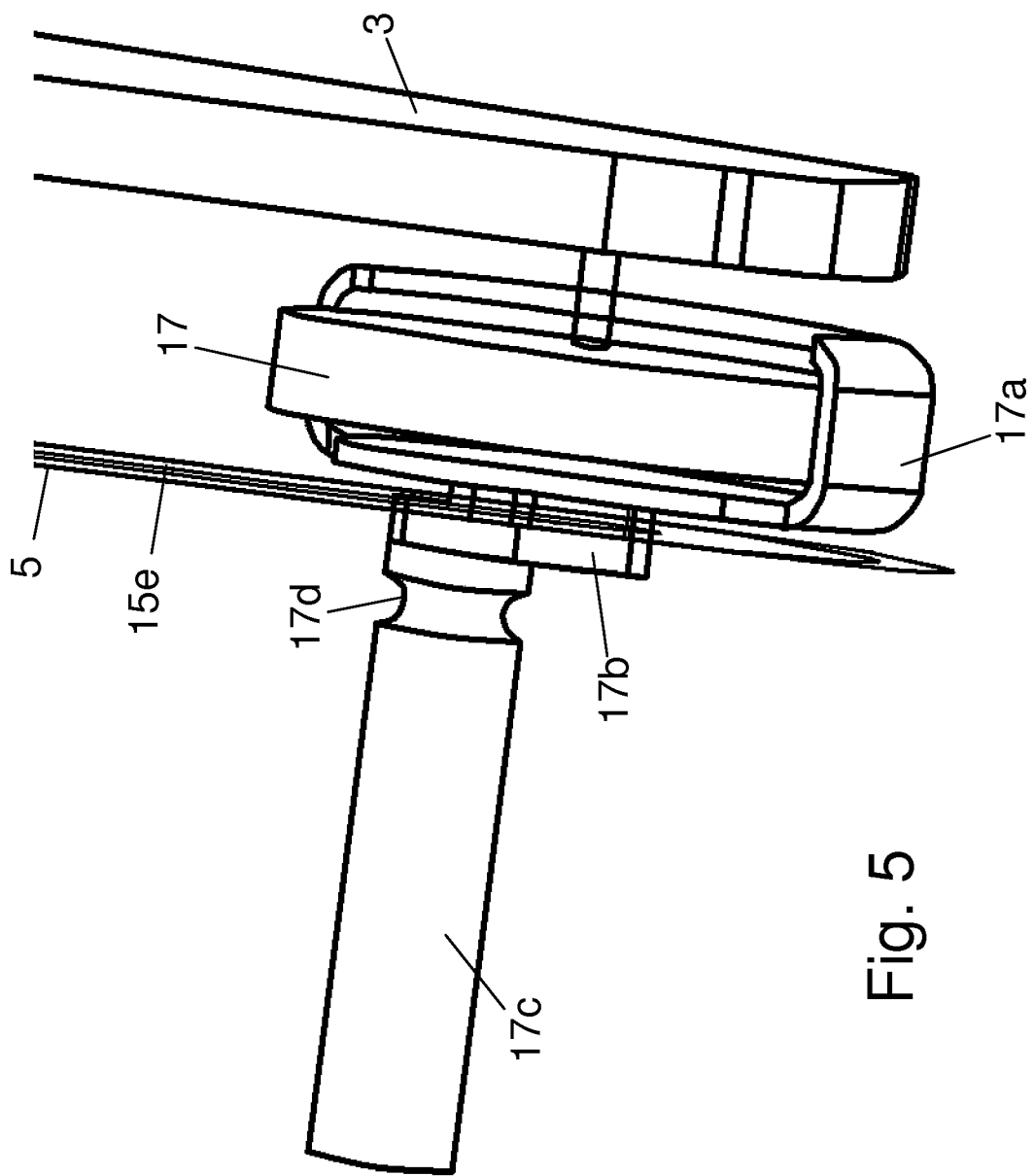
FIG. 5 is a perspective detail view of the front roller in the locked easy-entry position.

Referring to the drawings in particular, according to the exemplary embodiment, a vehicle seat 1 is provided for a rear row of seats of a motor vehicle, especially for the second row of seats of a van. However, the vehicle seat may, in principle, be used for all rows of seats. The arrangement of the vehicle seat 1 within the motor vehicle and the usual direction of travel of said vehicle determine the directional data used below. Vehicle seat 1 has a base 3, which is connected to the vehicle structure 7 via two tracks 5 arranged in parallel to one another. Part of the base 3 is a seat frame, which is not shown in more detail, and which carries a seat cushion 11 and here also a backrest 13. The vehicle structure 7 is designed such that a depression is provided for the leg room, i.e., the floor of the vehicle extends in two planes separated from one another by a step, wherein the seat is arranged on the upper plane.

In a variant of the exemplary embodiment that is not shown, the base 3 may additionally have a height and/or tilt adjuster. Furthermore, the backrest of the vehicle seat 1 may, of course, be made adjustable as well. A corresponding variation is also possible in case of the variants described later.

The tracks 5 each have a first, straight and horizontally extending area 15*a* and a second, straight area 15*b* extending obliquely thereto, which are connected to one another via a third, curved area 15*c*. The third, curved area 15*c* is arranged in front of the first area 15*a* in the direction of travel and in an area of the vehicle structure 7 in which this has said step downwards to form the leg room for an occupant. The curvature extends essentially with constant radius over an angle of about 80°, i.e., the second, straight area 15*b* is arranged at an angle smaller than 90° relative to the first, straight area 15*a*. However, other angles are possible since the track 5 is individually adapted to the particular vehicle structure 7. Track 5 is arranged in a C-shaped pattern with the opening directed outwardly.

However, all the track profiles known to the person skilled in the art and the different arrangements thereof are, in principle, possible.

Only one side of the vehicle seat will be described in detail below due to the essentially mirror-inverted design of the two sides of the vehicle seat.

The base 3 has a foot-like design at the end arranged in front in the direction of travel and is provided at the end with a first, front roller 17, which is mounted and guided in the track 5. A second, middle roller 23, which forms the pivot axis 19*a* for assuming the easy-entry position, is arranged somewhat behind the center at another foot. A third, rear roller 23" is arranged at a third foot at the rear end of the base 3 for additionally supporting the vehicle seat in the use position. The feet of the base 3 are positioned outside the tracks 5, and the axes, which carry the rollers 17, 23 and 23", extend from the outside to the inside.

The front roller 17 can be arranged rotatably in a shell- or cup-shaped mount 17*a*, and it enters this mount 17*a* only beginning from a position starting from the third, curved area 15*c* of the track 5, i.e., it is arranged away from mount 17*a* in the normal use position.

A tension spring 27 is arranged pivotably with one of its ends at the vehicle structure 7 at a bolt arranged somewhat above the track 5. The other end of the tension spring 27 is hung into a second bolt extending eccentrically from the mount 17*a* of the front roller 17. Mount 17*a* is guided in an elongated hole 15*e*, which is formed in track 5 starting approximately from the center of the curved area 15*c* up into the vicinity of the end of the second, straight area 15*b*. At its lower end, elongated hole 15*e* has an expansion 15*f*, whose function will be described in more detail below.

Mount 17*a* has a shape corresponding essentially to roller 17, and it is made open on one side, so that roller 17 can enter the mount 17*a* when it reaches said mount 17*a* and can carry same downward. Mount 17*a* has, furthermore, a guide and locking section 17*b* as well as a cross strut 17*c* for connecting the mounts 17*a* on both sides of the vehicle seat 1. A ring-shaped groove 17*d* each, which the corresponding tension springs 27 engage with their second ends and extend around the cross strut 17*c*, is formed in the cross strut 17*c* on both sides. Cross strut 17*c* is arranged eccentrically, as can be seen, for example, in FIG. 5. Mount 17*a* is held in the normal use position of the vehicle seat 1 by the tension spring 27 in the upper area of the elongated hole 15*e*.

The function of the vehicle seat 1 is as follows: The base 3 is locked with the vehicle structure 7 via said locking in the normal use position. If the vehicle seat 1 is to be moved into the easy-entry position, the locking is unlocked and the seat is pushed forward.

If the front rollers 17 reach the mounts 17*a* after unlocking the locking device (not shown) of the vehicle seat 1 and when the curved area 15*c* is reached, these mounts are carried, as a result of which the tension springs 27 are again tensioned. The tension springs 27 pull, moreover, the eccentrically arranged cross struts 17*c*, but no pivoting of the mounts 17*a* can take place, because the guide and locking sections 17*b* are guided in the elongated holes 15*e*. As soon as the front, first rollers 17 enter the third, curved area 15*c*, the rear, third rollers 23" move, furthermore, out of the tracks 5 through corresponding openings 15*g* formed in the upper area of the tracks 5, so that the pivoting motion of the vehicle seat 1 about the pivot axis 19*a* (middle rollers 23) in the forward direction begins.

This pivoting motion is continued during the transition of the rollers 17 into the second, straight area 15*b* and the tension springs 27 are tensioned more until the seat has reached its final position (easy-entry position), in which the front rollers 17 are in contact with the front, closed end of the tracks 5 here. In addition, a stop provided, for example, on the underside of base 3 may be in contact with the floor.

However, said expansions 15*f* are provided in the elongated holes 15*e* when the lowermost position is reached by the front rollers 17 arranged in the mounts 17*a*, so that the cross struts 17*c* are moved in a circular motion by about 45° as a consequence of the spring force of the tension springs 27, as a result of which the guide and locking sections 17*b* enter the expansions 15*f* of the elongated holes 15*e* with projecting areas, lock and fix as a result the mounts 17*a* together with the front rollers 17 in this lowermost position, i.e., the easy-entry position of the vehicle seat 1 is locked.

The pivoting motion of the seat is designed here such that when the inclination of the backrest is set in the so-called design position, in which backrest 13 is tilted backward by, for example, 23° in relation to the vertical position, the vehicle seat 1 is moved without adjustment of the tilt of the backrest into a position in which the backrest 13 is arranged in a nearly vertically extending position. In addition, base 3 is pressed upward in its rear area (behind the pivot axis 19*a*). As a result, much space is made available especially in the leg room for the entry or exit of a person into or from the row of seats located behind it.

The motions taking place during the transition from the use position into the easy-entry position consequently take place with a straight pushing motion and with a subsequent combined pushing and pivoting motion, the pivoting motion being dominant.

The return motion of the seat into the use position takes place in the reverse order. To release the locking, the cross struts 17c are pulled against the spring force in the opposite direction, so that the mounts 17a will turn back again. The guide and locking sections 17b can be subsequently guided upward along the elongated holes 15e, the mounts remaining in a nearly relaxed position of the tension springs 27 at the end of the elongated holes 15e and the rollers 17 moving out of the mounts 17a. Mounts 17a thus form, in conjunction with the tension springs 27, both a locking structure 29 for the easy-entry position and a force support for raising the vehicle seat 1 during the transition from the easy-entry position into the use position. Furthermore, the third, rear roller 23" is put in track during the return motion of the vehicle seat 1 from the easy-entry position into the use position during the final phase of the pivoting motion, i.e., before the combined pivoting and longitudinal motion passes over into a pure longitudinal motion. All rollers 17, 23, 23" are in contact with the track 5 here during the pure longitudinal motion and in the use position, so that the distribution of forces on the track 5 is improved.

If corresponding locking structures are provided for the easy-entry position, the space arranged behind the seat may also be used for transport purposes, i.e., the seat may remain in the easy-entry position.

The above-described tension spring in conjunction with the mount may, in principle, also be eliminated or replaced with suitable other means, which support the return motion of the vehicle seat from the easy-entry position into the use position.

According to a first variant of the exemplary embodiment, the front area of the track 5 is not designed as a C-profile but is made open upwardly, i.e., it has a trough shape. However, the rear area of the track 5 is designed corresponding to the above-described exemplary embodiment, so that the vehicle seat is secured against being lifted out of the track. The open design begins somewhat in front of the position in which the front roller 17 is arranged in the use position. Track 5 ends according to the first variant of the exemplary embodiment with a limit stop 15d, which has a shape corresponding to the front roller 17. An additional stop may be eliminated.

In another modified form of the first variant of the exemplary embodiment, not shown, the limit stop at the track may be eliminated and a stop between the base and the vehicle structure can prevent the front roller from getting out of track.

FIGS. 7 and 8 show another variant of the exemplary embodiment of a vehicle seat 1, which corresponds—unless described otherwise below—to the vehicle seat 1 of the first exemplary embodiment. The torsion bar spring 25 assumes the function of the tension spring of the exemplary embodiment here.

The vehicle seat 1 according to this variant is displaceable in a track 5 with C-shaped profile with front rollers 17, middle rollers 23 and rear rollers 23" for assuming the easy-entry position. Contrary to the first exemplary embodiment, an additional roller 23' is provided in front of the middle roller 23. The middle foot of the base 3 is supported mainly on the middle roller 23 here. The other, additional roller 23', arranged somewhat farther in the front, is connected to the base 3 via a multiply bent torsion bar spring 25 and plays only a secondary role in terms of the distribution of forces in the use position, because the torsion bar spring 25 is in a (relatively) relaxed position in the use position. However, as is shown in FIG. 5, the torsion bar spring 25 is tensioned by the pivoting motion of the base 3 to assume the easy-entry position. Thus, it applies a resetting force, which counteracts the force of gravity of the front seat area on the way to and in the easy-entry position. This resetting force facilitates the return of the vehicle seat 1 from the easy-entry position into the use position.

In a variant of this exemplary embodiment, the direction of action of the torsion bar spring 25, i.e., the torque exerted by same, may be reversed in case of seats whose center of gravity brings about an automatic pivoting back from the easy-entry position.

Torsion bar spring 25 has a first spring arm 25a, at the end of which the additional roller 23' is arranged, i.e., this end is movable in its position in one degree of freedom only along the longitudinal direction of the first, straight area 15a of the track 5. A fastening area 25b, which extends in the transverse direction of the seat (lateral direction of the vehicle), and which is bent by about 90° in relation to the first spring arm 25a and in the straight extension of which the torsion area 25c of the spring is located, is mounted in a bracket arranged at the base 3 of the vehicle seat 1. The other end of the torsion bar spring 25 is bent once again by about 90° and forms the second spring arm 25d, which is fastened on the other seat side at the base 3 by means of a clamp. Spring arms 25a, 25d form an angle relative to one another in the use position. The two spring arms 25a, 25d are arranged here in the easy-entry position essentially in parallel to one another, but other embodiments are possible as well. In particular, the second spring arm may also be fastened at the underside of the seat at the base.

Figure 9:
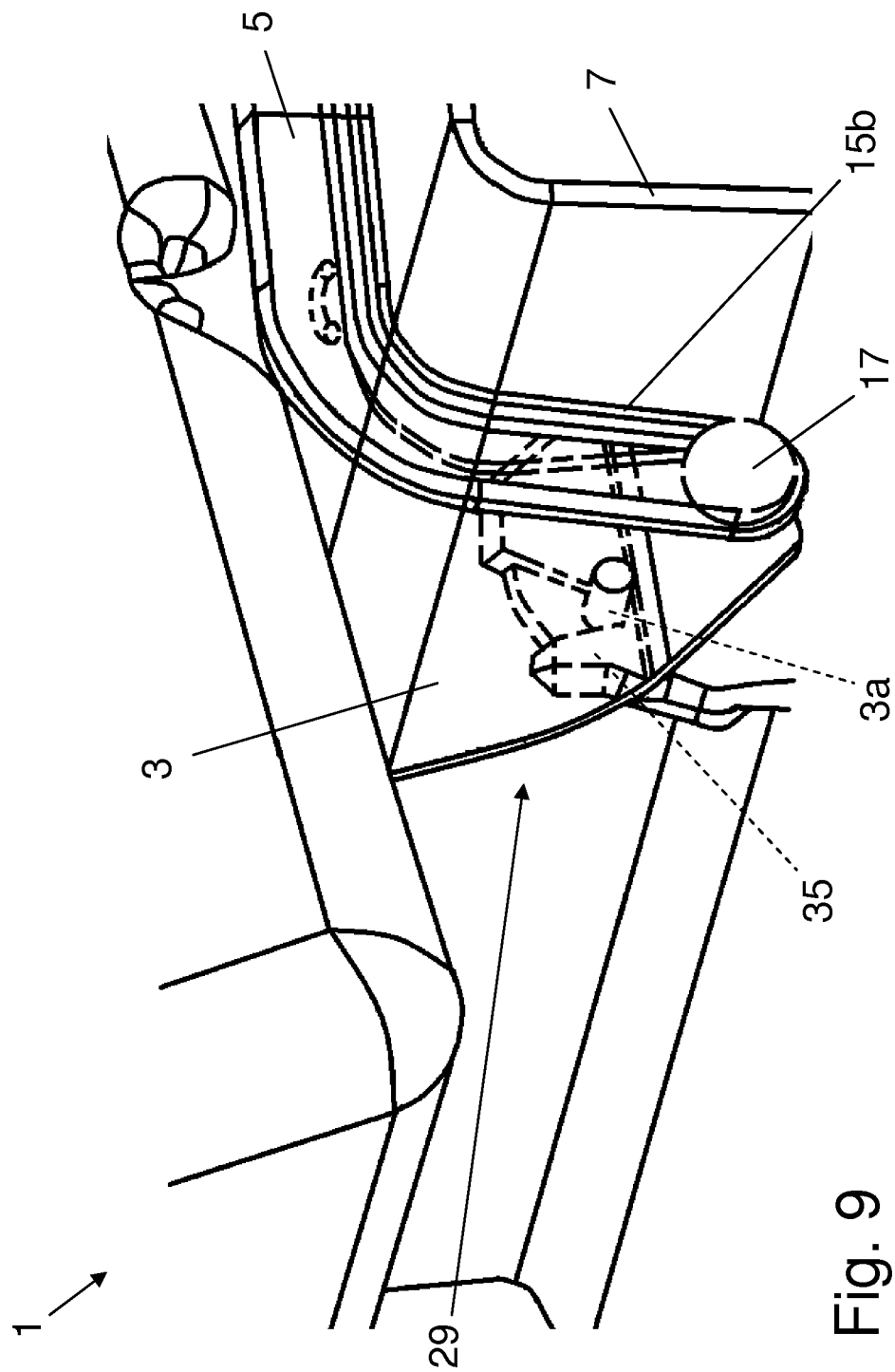
FIG. 9 is a perspective view showing another variant of the exemplary embodiment of a vehicle seat with a latch mechanism as a locking device for the easy-entry position.

FIG. 9 shows as another variant of the exemplary embodiment a vehicle seat 1, which has a latch mechanism 35, in which a bolt 3a arranged at the front foot of the base 3 is mounted in a groove of the latch mechanism 35 and is held by a latch, as the locking structure 29 for the easy-entry position. To leave the easy-entry position, the latch is opened, for example, by means of a Bowden cable, so that bolt 3a can be released and the vehicle seat 1 can again be moved back into the use position.

It is, of course, also possible to use link blocks, which slide along in the track, instead of rotatable rollers 17, 23, 23" and/or 23'.

While specific embodiments of the invention have been described in detail to illustrate the application of the principles of the invention, it will be understood that the invention may be embodied otherwise without departing from such principles.

LIST OF REFERENCE NUMBERS

1 Vehicle seat
3 Base
3a Bolt
5 Track
7 Vehicle structure
11 Seat cushion
12 Backrest
15a First, straight area
15b Second, straight area
15c Third, curved area
15d Limit stop
15e Elongated hole
15f Expansion
15g Opening
17 First, front roller
17a Mount (front roller)
17b Guide and locking section 17c Cross strut
17d Groove
19a Pivot axis
21 Locking structure (use position and optionally easy-entry position)
21a Strip
21b Bolt
21c Transverse axis
23 Second, middle roller
23' Additional roller
23" Third, rear roller
25 Torsion bar spring
25a First spring arm
25b Fastening area
25c Torsion area
25d Second spring arm
27 Tension spring
29 Locking structure (easy-entry position)
35 Latch mechanism

What is claimed is:

1. A vehicle seat comprising:
a base;
a track connected to a vehicle structure, the track having at least a straight horizontally extending area and at least one curved area; and
at least three rollers or link blocks connected to said base and engaging said track to support the vehicle seat in a use position and with only two of the rollers or link blocks engaging said track in an easy-entry position, wherein
a front roller or link block enters the curved area of the track and a second intermediate roller or link block is arranged in the straight horizontally extending area of the track in the easy-entry position, wherein
the vehicle seat is guided displaceably by said track and the seat is adjustable at least between the use position and the easy-entry position, wherein
the vehicle seat has a pivot axis extending at a right angle to a direction of extent of said track, said pivot axis being formed by an axis of the intermediate roller or link block of said at least three rollers or link blocks.

2. A vehicle seat in accordance with claim 1, wherein said track has a C-shaped design at least in a partial area and an opening, through which a rear roller or a link block of said at least three rollers or link blocks leaves the track for the seat to assume the easy-entry position, formed in said partial area.

3. A vehicle seat in accordance with claim 1, wherein said track has an additional straight area separated from said straight horizontally extending area by said curved area.

4. A vehicle seat in accordance with claim 1, wherein a curvature of said track, at said at least one curved area, forms an angle of up to 90°.

5. A vehicle seat in accordance with claim 4, wherein the curvature of said track forms an angle of up to 80°.

6. A vehicle seat in accordance with claim 1, further comprising at least one spring counteracting a force of gravity of the vehicle seat in the easy-entry position.

7. A vehicle seat in accordance with claim 6, wherein said spring is a torsion bar spring arranged in a rear area of the vehicle seat and is supported with one end displaceably in an area of said track and with another end at said base.

8. A vehicle seat in accordance with claim 6, wherein said spring is a tension spring arranged with one end at the vehicle structure and arranged with another end at a front element of the vehicle seat, which said element is guided in said track.

9. A vehicle seat in accordance with claim 1, further comprising a locking structure, wherein the vehicle seat is locked in the easy-entry position by said locking structure.

10. A vehicle seat for a vehicle having a vehicle structure, the vehicle seat comprising:
a base carrying a seat cushion with a connected backrest;
a first side track and a second side track, each track being connected to the vehicle structure, each track having a straight area and a curved area; and
a first set of rollers or link blocks for engagement with said first track to roll or slide along said first track and a second set of rollers or link blocks for engagement with said second track to roll or slide along said second track, each set of rollers comprising three rollers or link blocks connected to said base and engaging a respective said track to support the vehicle seat in a use position, two of said three rollers or link blocks engaging the respective said track in an easy-entry position, a front roller or link block following the track into said curved area of said track during movement to the easy-entry position and an intermediate roller or link block being arranged in said straight area of said track in the easy-entry position and one of said three rollers or link blocks being disengaged from the respective said track in the easy-entry position, wherein the vehicle seat is guided displaceably by said track and the seat is positionable at least between the use position and the easy-entry position, wherein the vehicle seat has a pivot axis extending at a right angle to a direction of extent of each said track, said pivot axis being formed by an axis of said intermediate roller or link block of each said set of rollers or link blocks.

11. A vehicle seat in accordance with claim 10, wherein:
each said track is at least partially C-shaped in cross section with an opening formed in a partial area; and
a rear roller or a link block of each set of rollers or link blocks is disengaged from the respective said track in the easy-entry position with each said rear roller or link block exiting the respective track through said opening for the seat to assume the easy-entry position.

12. A vehicle seat in accordance with claim 10, wherein each said track has an additional straight area separated from said straight area by said curved area.

13. A vehicle seat in accordance with claim 10, wherein a curvature of each said track, at said at least one curved area, forms an angle of up to 90°.

14. A vehicle seat in accordance with claim 13, wherein the curvature of said track forms an angle of up to 80°.

15. A vehicle seat in accordance with claim 10, further comprising at least one spring associated with each said set of rollers or link blocks, each said spring counteracting a force of gravity of the vehicle seat in the easy-entry position.

16. A vehicle seat in accordance with claim 15, wherein each said spring is a torsion bar spring arranged in a rear area of the vehicle seat and is supported with one end displaceably in an area of the respective said track and with another end at said base.

17. A vehicle seat in accordance with claim 15, wherein each said spring is a tension spring arranged with one end at the vehicle structure and arranged with another end at a front element of the vehicle seat, which said element is guided in the respective said track.

18. A vehicle seat in accordance with claim 10, further comprising a locking structure, wherein the vehicle seat is locked in the easy-entry position by said locking structure.

19. A vehicle seat comprising:
a base;
a track connected to a vehicle structure, the track having at least a straight area and at least one curved area;
three rollers or link blocks connected to said base and engaging said track to support the vehicle seat in a use position and with only two of the rollers or link blocks engaging said track in an easy-entry position, wherein the vehicle seat is guided displaceably by said track and the seat is adjustable at least between the use position and the easy-entry position, wherein the vehicle seat has a pivot axis extending at a right angle to a direction of extent of said track, said pivot axis being formed by an axis of an intermediate roller or intermediate link block of said at least three rollers or link blocks; and
a spring counteracting a force of gravity of the vehicle seat in the easy-entry position, wherein said spring is a torsion bar spring arranged in a rear area of the vehicle seat and is supported with one end displaceably in an area of said track and with another end at said base.

20. A vehicle seat comprising:
a base;
a track connected to a vehicle structure, the track having at least a straight area and at least one curved area;
three rollers or link blocks connected to said base and engaging said track to support the vehicle seat in a use position and with only two of the rollers or link blocks engaging said track in an easy-entry position, wherein the vehicle seat is guided displaceably by said track and the seat is adjustable at least between the use position and the easy-entry position, wherein the vehicle seat has a pivot axis extending at a right angle to a direction of extent of said track, said pivot axis being formed by an axis of an intermediate roller or intermediate link block of said at least three rollers or link blocks; and
a spring counteracting a force of gravity of the vehicle seat in the easy-entry position, wherein said spring is a tension spring arranged with one end at the vehicle structure and arranged with another end at a front element of the vehicle seat, which said element is guided in said track.

21. A vehicle seat comprising:
a base;
a track connected to a vehicle structure, the track having at least a straight area and at least one curved area;
three rollers or link blocks connected to said base and engaging said track to support the vehicle seat in a use position and with only two of the rollers or link blocks engaging said track in an easy-entry position, wherein the vehicle seat is guided displaceably by said track and the seat is adjustable at least between the use position and the easy-entry position, wherein the vehicle seat has a pivot axis extending at a right angle to a direction of extent of said track, said pivot axis being formed by an axis of an intermediate roller or intermediate link block of said at least three rollers or link blocks; and
a locking structure, wherein the vehicle seat is locked in the easy-entry position by said locking structure.

* * * * *